United States Patent
Franz et al.

(10) Patent No.: US 8,154,733 B2
(45) Date of Patent: Apr. 10, 2012

(54) METHOD AND SYSTEM FOR THE OPTICAL MEASUREMENT OF LARGE RADII OF CURVATURE OF OPTICAL FUNCTIONAL SURFACES

(75) Inventors: Stefan Franz, Jena (DE); Roland Schreiner, Orlamuende (DE)

(73) Assignee: Jenoptik Optical Systems GmbH, Jena (DE)

( * ) Notice: Subject to any disclaimer, the term of this patent is extended or adjusted under 35 U.S.C. 154(b) by 343 days.

(21) Appl. No.: 12/566,344

(22) Filed: Sep. 24, 2009

(65) Prior Publication Data
US 2010/0091298 A1    Apr. 15, 2010

(30) Foreign Application Priority Data
Sep. 25, 2008    (DE) .......................... 10 2008 049 159

(51) Int. Cl.
*G01B 11/02*    (2006.01)
(52) U.S. Cl. ....................................................... 356/513
(58) Field of Classification Search .................. 356/124, 356/127, 496, 511, 513–515
See application file for complete search history.

(56) References Cited

U.S. PATENT DOCUMENTS

| 5,355,210 | A | | 10/1994 | Keren et al. |
| 6,018,393 | A | * | 1/2000 | Takishima et al. ............ 356/511 |
| 6,909,509 | B2 | * | 6/2005 | De Groot ...................... 356/497 |

FOREIGN PATENT DOCUMENTS

| DE | 102 23 581 A1 | 12/2003 |
| DE | 10 2007 021 953 A1 | 11/2008 |

OTHER PUBLICATIONS

Han, Changyuan, et al.; "Interferometric testing for large optical elements"; Proceedings of SPIE 2000; 4231:269-276.

* cited by examiner

*Primary Examiner* — Michael A Lyons
(74) *Attorney, Agent, or Firm* — Duane Morris LLP

(57) ABSTRACT

The system and the method of the present invention differ from the prior art in that radii of curvature of any length of spherical and cylindrical test surfaces can be optically measured, with only a supplementary dual-focus lens being required in addition to an interferometer or an autocollimator. The supplementary dual-focus lens has a first focal plane, into which the surface vertex of the test surface is positioned, which establishes the cat's eye position (P(cat)), and a second focal plane into which the center of curvature of the test surface is moved, which establishes the autocollimation position (P(aut)) for the test surface. The radius of curvature of the test surface is determined from the distance between the focal planes (D(foc)) and the path of movement which can be reduced to zero.

13 Claims, 5 Drawing Sheets

METHOD AND SYSTEM FOR THE OPTICAL MEASUREMENT OF LARGE RADII OF CURVATURE OF OPTICAL FUNCTIONAL SURFACES

FIELD OF THE INVENTION

The subject matter of the present invention relates to a method and a system generically known from the article "Interferometric measurement of spherical mirror surfaces with large radii of curvature," published in the professional journal Photonik February 2007, pp. 84-85.

BACKGROUND OF THE INVENTION

Interferometric measurements of radii of optical functional surfaces (test surfaces) are commonly based on the Fizeau principle. Coherent collimated light from a source is split on an amplitude splitter surface located in the beam path. The reference wave travels back into itself. The test wave is transmitted through the amplitude splitter surface and reaches the specimen. Using a measuring lens, the shape of the wave can be fitted to different specimens. The amplitude splitter surface generally constitutes the last glass-air interface of the lens for spherical specimens. The test wave is generally fitted to the specimen if all beams of the test wave impinge vertically on the specimen. For a spherical specimen, a focusing measuring lens is used. To measure the surface fit, the specimen is subsequently placed at the distance from the measuring lens at which the center of curvature of the specimen coincides with the focal point of the measuring lens. After passing backward through the measuring lens, the test wave interferes with the reference wave. This type of test is referred to as interferometric null test, and a measuring lens functioning in this manner is a so-called optical null system.

The optical path differences between the reference wave and the test wave lead to an intensity modulation in the measured image (interference fringes). These interference fringes can be distinguished only within an optical path difference of one wavelength of the light used. Thus, the set distance between the measuring lens and the specimen cannot be readily determined. In an interferogram, it is possible to determine the difference in the curvature of the test wave at the site of the specimen but it is not possible to determine the distance of the specimen from the reference surface. Therefore, the absolute radius cannot be calculated from an interferogram.

To determine the radius of curvature of a curved reflecting surface (test surface) based on the Fizeau principle, the surface vertex of the test surface is generally placed in the focal point of the measuring lens (cat's eye position), on the one hand, and at a distance from the focal point which corresponds to the radius of curvature of the test surface (autocollimation position), on the other hand. These two specified positions can be determined very precisely by means of the interferometer since in these positions, interferograms that can be analyzed are obtained (see FIG. 1). In this figure, the cat's eye position is designated by P(cat), the autocollimation position by P(aut) and the radius of curvature by R.

The path of movement between the two positions corresponds to the radius of curvature of the test surface. Since a potential path of movement is limited by the local conditions, this type of measuring setup can be used only to a limited extent for measuring larger radii of curvature. Frequently, the technical limit is approximately 2 m. As to the measurable radii of curvature, it can be used only with a measuring lens for a range of radii if the test surface is a spherical surface.

To test aspheric test surfaces, the measuring lens must be individually fitted to the asphere of the test surface. The manufacture of aspheric measuring lenses that form beams by refraction of the wave entails a considerably greater degree of technical complexity than the manufacture of spherical refraction measuring lenses. Therefore, for the case mentioned, computer-generated holograms are used, often in combination with a Fizeau lens.

The use of this type of measuring setup is therefore limited to test surfaces with small to medium radii of curvature, and it is in practice useful only for spherical and cylindrical test surfaces.

The maximum distance to be set between the measuring lens and the test surface, which distance primarily determines the length of the measuring setup, is invariably greater than the radius of curvature of the test surface.

If the test surfaces to be tested are concave, this distance results from the sum of the focal length of the measuring lens and the radius of curvature of the test surface.

If the test surfaces to be tested are convex, this distance corresponds to the focal length of the measuring lens which must be greater than the radius of curvature of the test surface.

Theoretically, the length of the test setup could be shortened by using a measuring lens with a negative focal length. In practice, however, this leads to a virtual focal plane in which an arrangement of the test surface is not possible, and thus, it is also not possible to determine a path of movement, from which the radius of curvature can be derived.

As already mentioned, with respect to the measurable radius of curvature, the same limitation applies to spherical test surfaces and aspheric test surfaces alike, with the added problem that for each aspheric test surface that is to be tested, a specific measuring lens must be created, which lens must be able to transform a specific aspheric wave.

Instead of refractive measuring lenses, diffractive optical elements are generally used to test aspheric test surfaces.

Such diffractive optical elements can be, in particular, substrate plates, on the image-side surface of which a computer-generated hologram (CGH) is created. In this case, the CGH serves as an optical null system and deflects the test wave by diffraction in such a manner that this test wave impinges vertically on the aspheric test surface to be tested, is reflected back from this surface and is back-transformed by the CGH. A separately guided reference wave is subsequently superimposed on the test wave.

In measuring setups of this type, the substrate quality of the CGH and the quality of the other optical elements used in the interferometer, among other things, limit the accuracy of measurement.

PRIOR ART

DE 102 23 581 A1 discloses a system based on the Fizeau principle with a diffractive optical element for interferometrically measuring departures from the specified shape of a curved reflecting surface. In contrast to the prior art, the diffractive optical elements serves both as a beam splitter and reference mirror in reflection and as an optical null system in transmission.

Due to the setup as a Fizeau interferometer, the system is relatively impervious to deviations of the phase front of the wave impinging on the diffractive optical element, such as can develop, for example, as a result of quality tolerances of the substrate of the diffractive optical element.

A diffractive optical element as disclosed in DE 102 23 581 A1 is characterized by a diffractive structure which reflects a portion of the wave (reference wave) and transmits a transformed portion of the wave (test wave).

In addition to these two functions, it is possible to integrate additional transformation functions into the diffractive optical element. These include, e.g., alignment holograms or, instead of one, a plurality of optical null systems, so as to be able to test a plurality of test surfaces with different curvatures, in this case, aspheric test surfaces.

The system described in DE 102 23 581 A1 is to be used to carry out surface fit measurements, which means that the surface deviations of the test surface from the nominal shape are to be detected. To determine the radius of a test surface (which is, however, not disclosed in the document cited), the test surface, as explained in the introductory description of the prior art, would have to be placed into the two specified positions, i.e., the cat's eye position and the autocollimation position, and the path of movement would have to be determined. As to using this system to measure larger radii of curvature, this means that the system described is just as unsuitable as a measuring setup with a refractive measuring lens described above. The use of diffractive auxiliary structures for this purpose is not described in the DE 102 23 581 A1.

The article "Interferometric measurement of spherical mirror surfaces with large radii of curvature," published in the professional journal Photonik February 2007, pp. 84-85, describes a measuring system which, using a diffractive optical element, in this case the so-called Diffractive Fizeau Null Lens (DFNL), as described in DE 102 23 581 A1, allows the measurement of large radii of spherical convex and concave test surfaces.

To this end, a DFNL is used, which generates a slightly divergent test wave, and a movable achromat is placed downstream in the beam direction. By varying the distance between the DFNL and the achromat, the divergence of the test wave is adjustable within a small range, thus allowing a null test spanning a measuring range for radii of curvature with an absolute value greater than one meter to be carried out. For a given stationary specimen, the achromat is placed at a distance from the DFNL at which the mean curvature in the interferogram is minimal. The corresponding radius of curvature of the test surface can subsequently be calculated from the characteristic values of the DFNL, the achromat and the distance set between the two. The interferogram also shows the deviations of the specimen from the ideal spherical shape.

As the author himself admits, the measuring system described is not strictly based on the Fizeau principle since only the test wave, but not the reference wave, passes through the achromat. Thus, both the optical errors and the alignment errors of the achromat directly influence the surface measurement.

In addition, this measuring system is limited to large radii of curvature and requires an additional optical element, i.e., the achromat.

OBJECTS OF THE INVENTION

The problem to be solved by the present invention is to make available a method and a system by means of which radii of curvature of any length can be measured with only one wavefront-transforming optical element.

This problem is solved with a system and method having the features set forth in the annexed claims.

SUMMARY OF THE INVENTION

It is an essential feature of the present invention that, in contrast to the prior art where only one transmitted test beam path is generated, two transmitted test beam paths (when an interferometer is used, these are referred to as test waves) are generated from the collimated light from a source, which collimated light, when an interferometer is used, is coherent as well, with the two transmitted test beam paths on the optical axis of a supplementary dual-focus lens being focused into two focal planes that are located at a fixed distance from each other.

The distance between the focal planes is determined as a function of the radii of curvature of spherical test surfaces, the radius of curvature of which is to be determined.

For example, if radii of curvature of spherical test surfaces from 2-4 m are to be measured, the distance between the focal planes is preferably specified as 3 m, which leads to a maximum necessary movement of the specimen of ±1 m. For convex test surfaces, two real focal planes are generated. For concave test surfaces, especially for those with a small curvature, one focal plane will be virtual. It is also possible to measure the radius of curvature of a cylindrical test surface or the two radii of curvature of a toric test surface.

In the prior art, for measurements of the radius of curvature of a test surface by moving the specimen between the two specified positions P(cat) and P(aut), not only interferometers but also autocollimators are used since it is possible, both with an interferometer and with a collimator, to determine the focus position of an auxiliary lens (supplementary lens) via reflected radiation.

The method according to the present invention in which the path of movement is shortened or completely eliminated can therefore also be implemented by using an autocollimator. All that changes is the type of indicator for the condition that the specimen is located in position P(cat) or P(aut). In the interferogram, the residual curvature error is determined from the fringe pattern, and in the autocollimator, a sharpness criterion is calculated from a fiducial image.

When the autocollimator is used, the supplementary dual-focus lens splits the impinging collimated light by means of aperture splitting or amplitude splitting into two test beam paths with two different focal planes. In a manner identical to the interferometric method described below, the focal planes are positioned so that they are located in or near the surface vertex or the center of curvature of the test surface so that the necessary path of movement disappears or is at least reduced to a distance markedly shorter than the radius of curvature.

When an interferometer is used, the coherent collimated light impinging on the supplementary dual-focus lens is also split into two test beam paths, which, in this context, are called test waves, one of which waves is transformed so that its wavefront fits the surface shape of the test surface. The focal plane of this test wave, which hereinafter will be referred to as the second test wave, is to be formed in the focus position P(foc) and is to constitute the second focal plane.

The other test wave, which hereinafter will be referred to as the first test wave, is focused into a first focal plane in which the specimen is positioned so that the surface vertex of the test surface is located in the first focal plane and determines the cat's eye position (Pcat).

When the distance set between the two focal planes D(foc) is favorable, the focus position P(foc) coincides with the center of curvature of a test surface located in the cat's eye position P(cat) so that the autocollimation position P(aut) coincides with the cat's eye position. Otherwise, the specimen must be moved by means of a movable mount along the optical axis until the center of curvature C of the specimen coincides with the focus position P(foc).

The radius of curvature R is subsequently determined from the known distance between the focal planes D(foc) and the path of movement V. The distance between the focal planes D(foc) can be obtained from the design features of the supplementary dual-focus lens which splits the wavefronts or beam paths, or it can be experimentally determined.

BRIEF DESCRIPTION OF THE DRAWINGS

The system will be explained in greater detail by way of an example with reference to the drawings, in which:

FIGS. 6a and 6b show a top view of a system with a supplementary lens comprising a refractive and a diffractive element.

DESCRIPTION OF THE EMBODIMENTS

Figure 1:
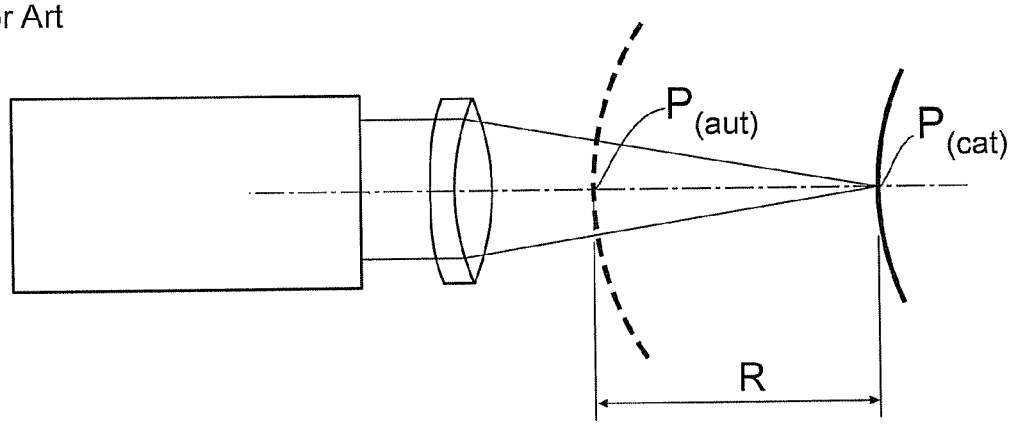
FIG. 1 is a diagrammatic sketch of a system known from the prior art.

A system according to the present invention comprises either an interferometer 1 or an autocollimator, either of which, in combination with a supplementary dual-focus lens 3 downstream in the beam direction, is disposed on a common optical axis 4.

The dual-focus lens can comprise two refractive optical elements, two diffractive optical elements or a combination thereof.

Depending on the curvature of the test surface 5 (on spherical test surfaces and/or cylindrical test surfaces, this curvature is defined by the radius of curvature R), the focal planes of the dual-focus lens are preferably specified so that their distance D(foc) corresponds to the radius of curvature R. If the system is to be used to test specimens with different radii of curvature R which are within a range of radii of curvatures, the distance between the focal planes D(foc) used is preferably identical to the mean value of the range of radii of curvature through all specimens.

In all embodiments of supplementary dual-focus lenses 3, regardless of the curvature of the test surface 5, the supplementary dual-focus lens 3, for the benefit of a short overall length, is designed so that its first focal plane is disposed near the light-emergent surface. To carry out the measurement, the surface vertex of the test surface 5 of the specimen in this first focal plane is positioned in a specially provided mount, which establishes the cat's eye position P(cat).

Figure 4:
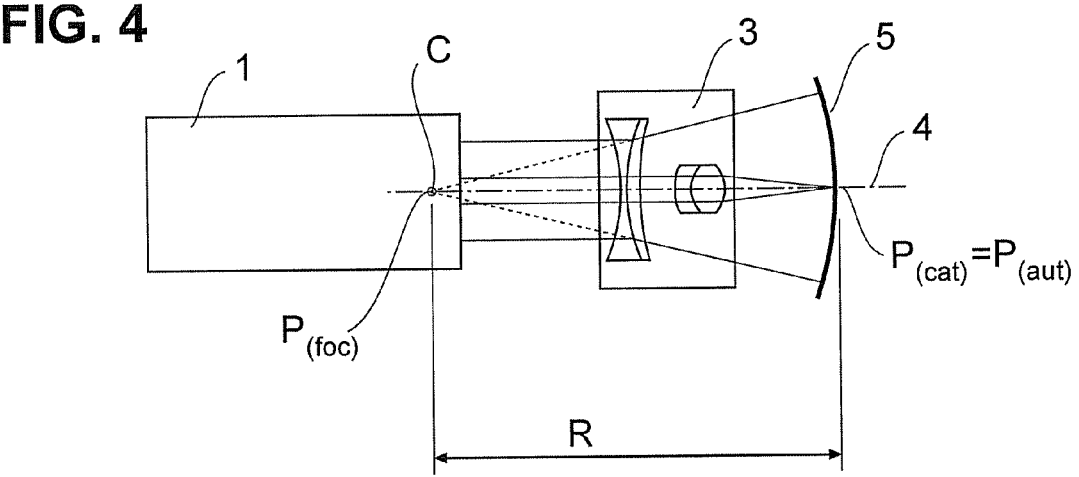
FIG. 4 is a sketch of a system with a supplementary lens comprising two refractive optical elements.

If, for the sake of simplification, one assumes that the system is designed for specimens having only one nominal radius, it is useful to place the focus position P(foc) of the second focal plane into the plane in which the center of curvature C of a spherical test surface 5, which is disposed in the cat's eye position P(cat), is located. In this case, the test surface 5 is also in the autocollimation position P(aut), as shown in FIG. 4.

Figure 2:
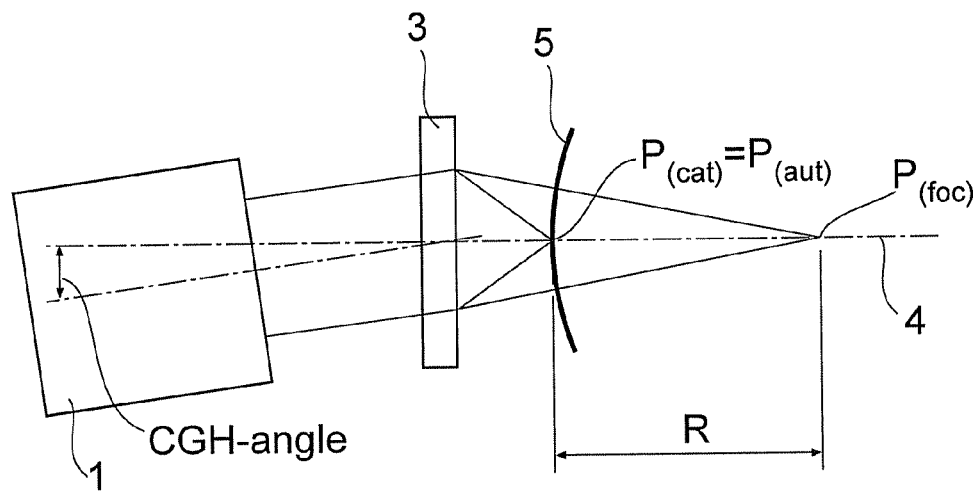
FIG. 2 is a diagrammatic sketch of a system for a convex spherical test surface.
Figure 3:
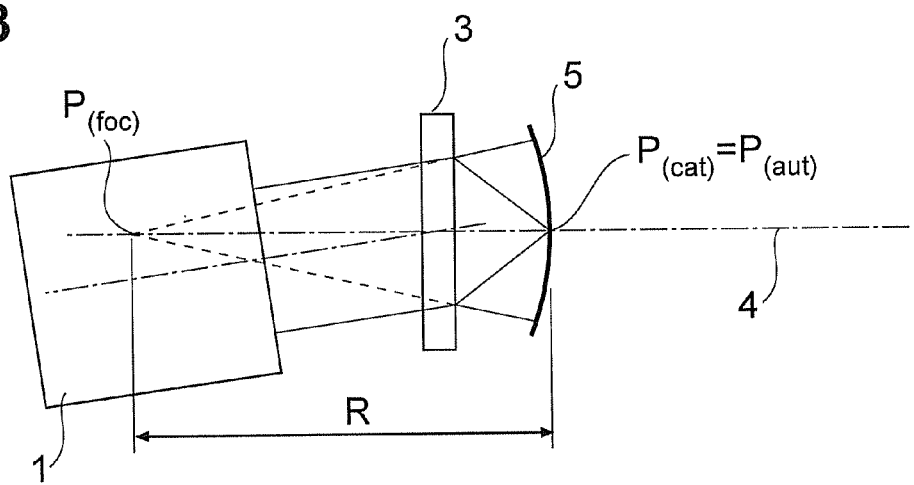
FIG. 3 is a diagrammatic sketch of a system for a concave spherical test surface.

FIGS. 2 and 3 show the focus positions P(foc) for oppositely curved spherical test surfaces 5 in which the center of curvature C coincides with the focus position P(foc).

If the radius of curvature R of the test surface 5 corresponds to the specified nominal radius of curvature, it is not necessary to move the specimen, which, in combination with an interferometer 1, is determined based on the analyzable simultaneously obtained interferograms and, in combination with an autocollimator, based on the sharpness of the image of a fiducial mark or a test. If a movement of the specimen is still necessary, this is a measure of the deviation of the actual radius of curvature R of the test surface 5 (actual radius of curvature) from the nominal radius of curvature.

Figure 5:
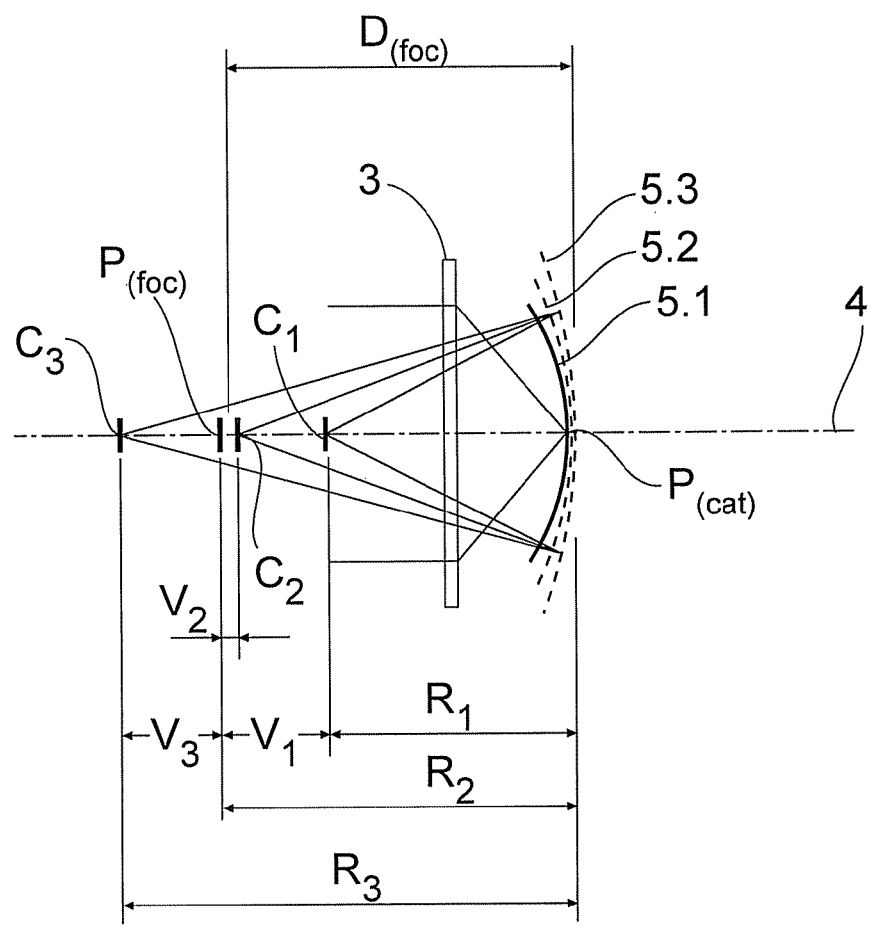
FIG. 5 is a sketch showing three concave test surfaces.

FIG. 5 shows three concave test surfaces 5.1, 5.2, 5.3 in the cat's eye position, which surfaces have different radii of curvature R1, R2, R3 which, for testing, are to be alternatively disposed in this position.

Commensurate with the different curvature of these surfaces, the centers of curvature C1, C2, C3 of the surfaces are located at different distances from the cat's eye position P(cat) on the optical axis 4.

The supplementary dual-focus lens 3 was then configured to advantage in such a manner that its second focal plane is located halfway between the two radii of curvature R1 and R3 that limit the range of radii of curvature, which second focal plane determines the focus position P(foc).

To move each test surface 5 into the autocollimation position P(aut) for the desired purpose of measurement, the specimens and thus the test surfaces 5 must be moved in the direction of the optical axis 4 by a path of movement V1, V2 or V3 so that the center of curvature C1, C2 or C3 coincides with the focus position P(foc).

To determine whether the surface vertex of the test surface 5 and the center of curvature C of the test surface 5 are in the specified position P(cat) or P(aut), respectively, the method described in the prior art is used.

As already mentioned, generally the supplementary dual-focus lens 3 can be an assembly of refractive, diffractive or mixed optical elements.

In FIG. 4, the supplementary dual-focus lens 3 is constructed of two refractive optical elements. A diverging lens or a group of diverging lenses forms a diverging second test wave which, in the marginal region, impinges on, in this case, a spherical concave test surface 5 and is focused in the focal point that forms the second focal point of the supplementary dual-focus lens 3. Thus, the specimen is located in the beam path of the second test wave so that the focal point coincides with the center of curvature C of the test surface 5.

Disposed downstream of the diverging lens in the beam direction is a collecting lens or a group of collecting lenses which focuses the radiation near the axis in the first focal point of the supplementary dual-focus lens 3 onto the surface vertex of the test surface 5.

A supplementary dual-focus lens 3 with exclusively refractive optical elements is useful for combination with an autocollimator and allows a change of the distance between the focal points by moving the optical elements relative to each other. Using this type of configuration or a supplementary dual-focus lens 3 of mixed configuration, such as shown in FIGS. 6a and 6b, in which the first focal point is preferably formed by means of a refractive optical element, it is possible not only to use the system for test surfaces 5 of a limited range of centers of curvature but to fit it individually to different radii of curvature so as to minimize or completely obviate the path of movement V.

Figure 6A:
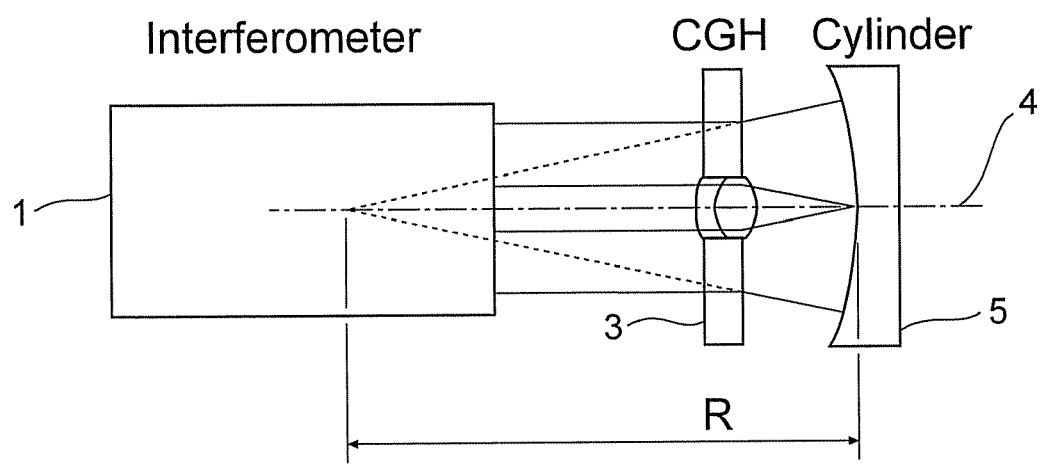
FIG. 6a shows a lateral view of a system with a supplementary lens comprising a refractive and a diffractive optical element.
Figure 6B:
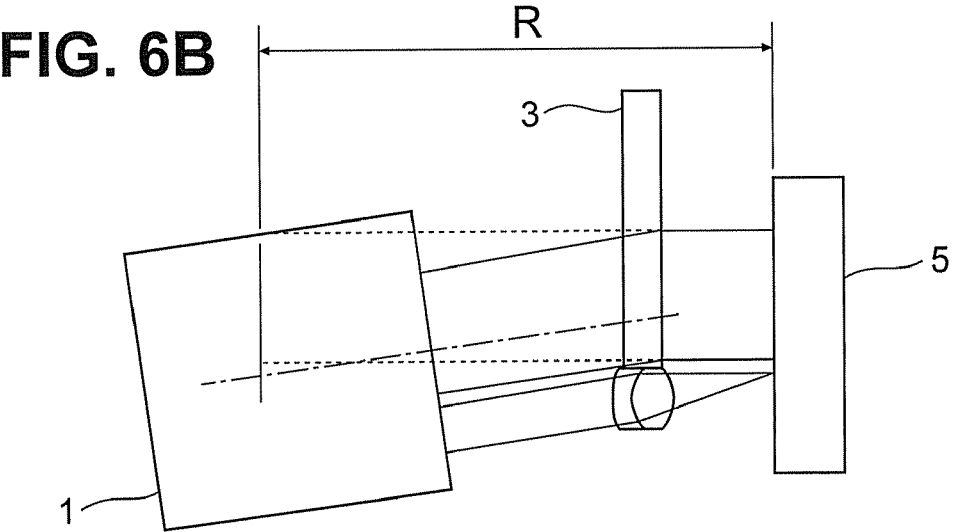

The person skilled in the art is aware of the fact that in the practical example shown in FIGS. 6a and 6b, which is intended for a cylindrical test surface 5, focal lines instead of focal points are generated.

Figure 7:
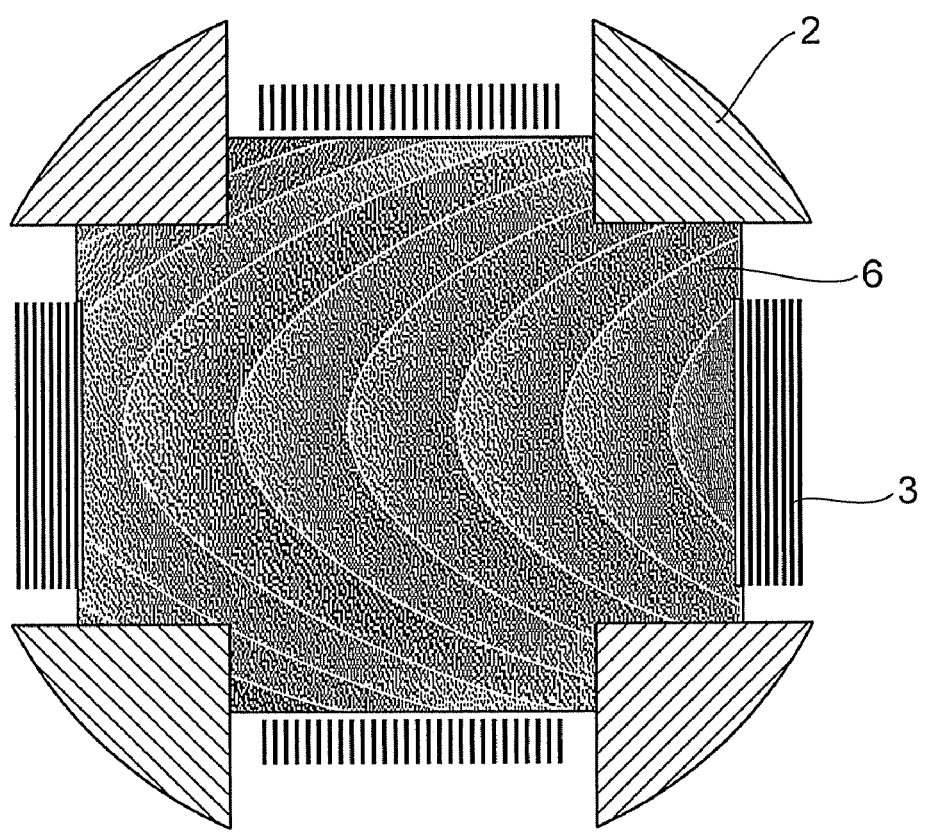
FIG. 7 illustrates a supplementary dual focus lens, having only one diffractive element.

FIG. 7 shows a supplementary dual-focus lens 3 comprising only a diffractive optical element. This diffractive optical element is a substrate plate, into or on one surface of which computer-generated holograms (CGHs) have been incorporated or created, respectively.

The central coherent CGH 6 transforms the impinging light into a second transmitted test wave so that the wavefront of this test wave assumes the shape of a cylinder and is focused in the second focal plane of the supplementary dual-focus lens 3 into a lens. By changing the sign of the CGH angle at which this CGH 6 is illuminated, the shape of the cylinder can be changed from concave to convex and vice versa.

Depending on whether the wavefront is to be transformed into a concave or convex cylindrical shape, the focal plane of the first test wave should be real or virtual, for which reason the diffractive optical element provides for a wave transformation for both options. To this end, pairs of hologram segments 2 are disposed off-center. Each two neighboring mirror-symmetrical hologram segments 2, preferably the hologram segments 2 that are superjacent to each other, are responsible for guiding the beam of a test wave.

Additional test structures for the purpose of adjustment are disposed between the hologram segments 2.

An advantage of using exclusively diffractive optical elements is that simply by changing the sign of the CGH angle, it is possible to switch from a divergent testing method to a convergent testing method. In addition, it is possible to freely specify the distance between the focal planes D(foc) since the position of these planes is generated by computer control, i.e., steplessly, or a plurality of focal planes can be coded in one surface.

The distance between the focal planes D(foc) remains the same even if the CGH 6 is used with another interferometer 1.

LIST OF THE REFERENCE SYMBOLS

1 Interferometer
2 Hologram segment
3 Supplementary dual-focus lens
4 Optical axis
5 Test surface
6 Central CGH
R Radius of curvature
C Center of curvature
P(foc) Focus position
P(cat) Cat's eye position
P(aut) Autocollimation position
V Path of movement
D(foc) Distance between the focal planes While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. A system for optically measuring large radii of curvature of optical functional surfaces, comprising an interferometer and a supplementary lens disposed downstream in the beam direction to fit a plane wavefront of a test wave transmitted by said interferometer to a specified curvature of a nominal surface for a test surface,
a mount for a specimen,
a mechanism for moving the mount along an optical axis of the supplementary lens, and
a path measuring system for measuring a path of movement,
said supplementary lens being a supplementary dual-focus lens having a second focal plane in a focus position disposed at a distance (D(foc)) from a first focal plane, and
said mount being positioned such that a surface vertex of a test surface of said specimen in the mount is located in the first focal plane, thereby establishing a cat's eye position,
said mount being moveable by a path of movement to move a center of curvature of the test surface into the focus position, which establishes an autocollimation position.

2. The system as in claim 1, wherein said interferometer is replaced with an autocollimator.

3. The system as in claim 1, wherein said supplementary dual-focus lens is constructed of refractive optical elements.

4. The system as in claim 1, wherein said supplementary dual-focus lens is constructed of diffractive optical elements.

5. The system as in claim 1, wherein said supplementary dual-focus lens is constructed of a combination of refractive and diffractive optical elements.

6. The system as in claim 1, wherein the distance (D(foc)) corresponds to the radius of curvature of the nominal surface for a test surface.

7. The system as in claim 1, wherein said supplementary dual-focus lens has focal points in the focal planes so as to allow the measurement of spherical test surfaces.

8. The system as in claim 1, wherein said supplementary dual-focus lens has focal lines in the focal planes so as to allow the measurement of cylindrical test surfaces.

9. A method of optically measuring large radii of curvature of optical functional surfaces in which collimated light from a source is transformed by a supplementary lens into a test wave, that the transformed test wave is reflected back into itself on a specimen in that, on the one hand, a vertex of the test surface is positioned in a focal plane of the supplementary lens and, on the other hand, a center of curvature of the test surface is made to coincide with said focal plane, and that a path of movement between the two positions of the test surface is determined, comprising forming two test waves, each test wave having a focal plane,
said focal planes being positioned at a specified distance from each other,
that a vertex of the test surface is disposed in a first focal plane, which establishes a cat's eye position, and
subsequently moving the center of curvature into a second focal plane, which causes the test surface to be moved into an autocollimation position, and
a radius of curvature of the test surface is calculated from the path of movement and a distance (D(foc)).

10. A method as in claim 9, wherein at first the center of curvature of the test surface is disposed in said second focal plane and subsequently the vertex of the test surface is disposed in the first focal plane.

11. A method as in claim 9, wherein the collimated light is transformed by an interferometer into a test wave with a curved wavefront, the curvature of which corresponds to a nominal surface of the test surface and a reference wave is superimposed onto the two test waves that are reflected into themselves so as to generate an interferogram.

12. A method as in claim 9, wherein the collimated light is emitted by an autocollimator and the two test waves that are reflected into themselves influence the imaging sharpness of a fiducial mark of the autocollimator.

13. A method as in claim 9, wherein the two test waves are focused at a distance D(foc) that corresponds to a nominal radius of curvature of the test surface of a specimen, which reduces a movement to a deviation of the actual radius of curvature of the test surface from the nominal radius of curvature or completely obviates such a movement.

* * * * *